US008982106B2

(12) United States Patent
Moriwaki

(10) Patent No.: US 8,982,106 B2
(45) Date of Patent: Mar. 17, 2015

(54) DISPLAY DEVICE WITH FLEXIBLE SUBSTRATE AND METHOD OF CONTROLLING DISPLAY DEVICE

(75) Inventor: Toshiki Moriwaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 160 days.

(21) Appl. No.: 12/956,392

(22) Filed: Nov. 30, 2010

(65) Prior Publication Data

US 2011/0134087 A1 Jun. 9, 2011

(30) Foreign Application Priority Data

Dec. 7, 2009 (JP) ................................ 2009-277851

(51) Int. Cl.

*G06F 3/038* (2013.01)
*G09G 5/00* (2006.01)
*G09G 3/20* (2006.01)

(52) U.S. Cl.

CPC .......... *G09G 3/20* (2013.01); *G09G 2340/0464* (2013.01); *G09G 2340/0492* (2013.01)
USPC ................ 345/204; 345/76; 345/619; 345/82

(58) Field of Classification Search

CPC ..................... G06F 2203/04102; G06F 1/1652
USPC .............. 345/76, 82, 104, 156–184, 204, 619
See application file for complete search history.

(56) References Cited

U.S. PATENT DOCUMENTS

| | | | | |
|---|---|---|---|---|
| 7,109,967 | B2 * | 9/2006 | Hioki et al. | 345/104 |
| 7,230,585 | B2 * | 6/2007 | Wakefield | 345/55 |
| 2003/0227441 | A1 | 12/2003 | Hioki et al. | |
| 2004/0080468 | A1 | 4/2004 | Wakefield | |
| 2008/0291225 | A1 | 11/2008 | Arneson | |
| 2009/0219247 | A1 * | 9/2009 | Watanabe et al. | 345/157 |

FOREIGN PATENT DOCUMENTS

| | | |
|---|---|---|
| JP | 07-218899 | 8/1995 |
| JP | 08-184821 | 7/1996 |
| JP | 2001-345184 | 12/2001 |
| JP | 2002-258776 | 9/2002 |
| JP | 2002-278515 | 9/2002 |
| JP | 2003-035893 | 2/2003 |
| JP | 2005-173193 | 6/2005 |
| JP | 2007-240617 | 9/2007 |
| WO | 03/077231 | 9/2003 |

OTHER PUBLICATIONS

European Search Report dated Mar. 24, 2011 in connection with counterpart EP Application No. 10 01 4697.
Japanese Office Action issued in connection with related Japanese Patent Application No. JP 2009-277851 dated Jul. 23, 2013.

* cited by examiner

*Primary Examiner* — Lun-yi Lao
*Assistant Examiner* — Ibrahim Khan
(74) *Attorney, Agent, or Firm* — Dentons US LLP

(57) ABSTRACT

A display device includes flexible substrate, a display unit including multiple light-emitting elements arranged at the substrate and configured to display an image according to an image signal, a displacement sensor provided to at least one of a front surface and a back surface of the substrate and configured to detect a curved state of the substrate, and a control unit configured to perform a flip control with respect to the image displayed in the display unit when a curve of the substrate is detected by the displacement sensor.

6 Claims, 8 Drawing Sheets

DISPLAY DEVICE WITH FLEXIBLE SUBSTRATE AND METHOD OF CONTROLLING DISPLAY DEVICE

BACKGROUND OF THE INVENTION

1. Field of the Invention

The present invention relates to a display device and a method of controlling a display device.

2. Description of the Related Art

In recent years, ensuring reliability of a display element in a display device has become an extremely important challenge. Particularly, ensuring structural and mechanical reliability or reliability relating to display performance is still a crucial matter as has been in the past.

For example, Japanese Unexamined Patent Application Publication No. 2005-173193 discloses a technique in which a situation of an image is determined from data, such as image data, that can indicate a display state of a device and lighting of a horizontal scan line is controlled to prevent overcurrent, in order to prevent life degradation of an element due to temperature rise according to current flow amount.

Also, Japanese Unexamined Patent Application Publication No. 2007-240617 describes that a control of an optical characteristic such as refractive index is performed using a photodetector as a polarization detecting unit by quantitatively detecting a change amount of deformation due to minute stress applied to a display device as a change in polarization state of incident light.

SUMMARY OF THE INVENTION

However, the technique described in Japanese Unexamined Patent Application Publication No. 2005-173193 has a problem in that manufacturing cost increases in order to ensure reliability, since various feedback controls are used, i.e., many algorithms are used, for a complex control combining both a gate signal and a source signal, control of lighting period, and the like. Also, a complex algorithm control leads to an increase in power consumption of a driver IC, causing a decrease in power performance.

With the technique described in Japanese Unexamined Patent Application Publication No. 2007-240617, detecting a minute refractive index according to deformation is difficult when there is noise due to reflection of external light or light scattering by relatively strong external light from another light source such as, for example, sunlight or fluorescent light in a room.

Thus, it is desirable to provide a novel and improved display device and method of controlling a display device capable of ensuring reliability of display at the time of curving of a flexible display device by performing an image flip control according to a curve amount at the time of curving.

According to an embodiment of the present invention, there is provided a display device including a flexible substrate, a display unit including multiple light-emitting elements arranged at the substrate and configured to display an image according to an image signal, a displacement sensor provided to at least one of a front surface and a back surface of the substrate and configured to detect a curved state of the substrate, and a control unit configured to perform a flip control with respect to the image displayed in the display unit when a curve of the substrate is detected by the displacement sensor.

The control unit may perform the flip control with respect to the image displayed in the display unit when a curve amount of the substrate exceeds a predetermined value.

The control unit may perform the flip control with respect to the image displayed in the display unit according to the curve amount of the substrate and a curve position of the substrate.

The display device may further include an image flip arithmetic unit configured to determine an advisability of the flip control based on a lookup table specifying a relation between an output of the displacement sensor and the advisability of the flip control of the image. The control unit may perform the flip control with respect to the image displayed in the display unit based on the advisability of the flip control determined by the image flip arithmetic unit.

The substrate may be transparent.

When the substrate is bending, the control unit may perform the flip control with respect to the image displayed in the display unit in a moderate manner compared to when the substrate is recovering.

When the curve is such that a display surface of the display unit is a convex portion in a result of detection of the curved state by the displacement sensor, the control unit may perform the flip control with respect to the image displayed in the display unit in a moderate manner compared to when the curve is such that the display surface of the display unit is a concave portion.

The displacement sensor may include a pair of transparent electrodes formed of ITO or IZO and be configured to detect the curved state of the substrate based on a change in resistance value between the pair of transparent electrodes.

According to another embodiment of the present invention, there is provided a method of controlling a display device, including the steps of detecting a curved state of a flexible substrate provided with a display unit configured to display an image according to an image signal, and performing a flip control with respect to the image displayed in the display unit when a curve of the substrate is detected in the step of detecting the curved state.

According to the embodiments of the present invention described above, it is possible to provide a novel and improved display device and method of controlling a display device capable of ensuring reliability of display at the time of curving of the flexible display device by performing an image flip control according to a curve amount at the time of curving.

DESCRIPTION OF THE PREFERRED EMBODIMENTS

Figure 1:
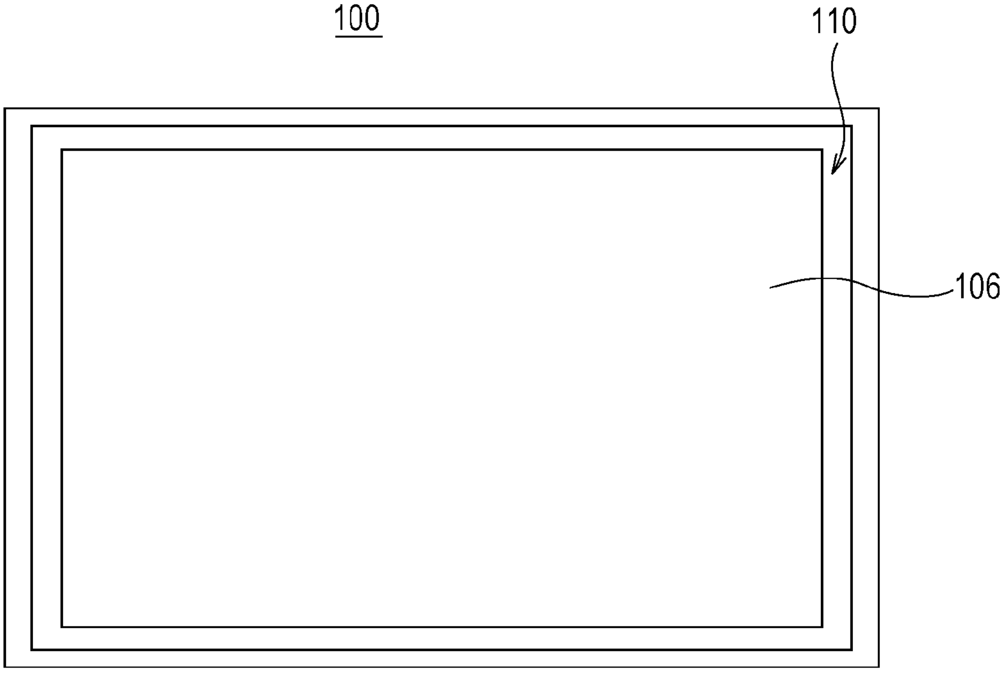
FIG. 1 is a plan view showing a surface on the front side of a display device according to an embodiment of the present invention.

A preferred embodiment of the present invention will be described in detail below with reference to the accompanying drawings. Note that, in this specification and the drawings, components having substantially the same functional configuration are denoted by the same reference numeral to omit redundant description.

Note that descriptions will be given in the following order.

[1. Configuration example of display device]

[2. Function block configuration of display device]

[3. Function block configuration of control unit]

[4. Configuration example in which displacement sensor is provided to front and back surfaces]

[5. Another example of lookup table]

[1. Configuration Example of Display Device]

Figure 2:
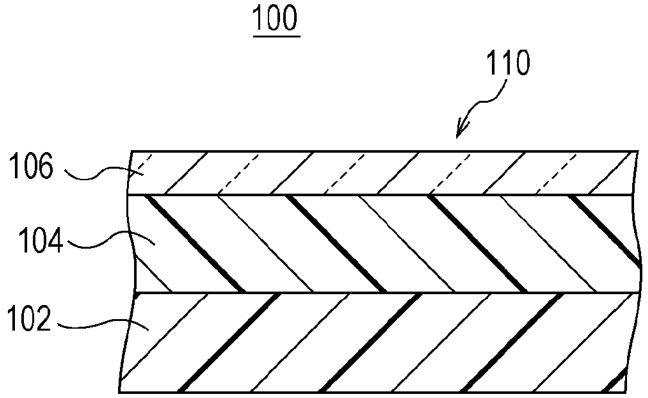
FIG. 2 is a schematic view showing a sectional surface of the display device.

First, with reference to FIGS. 1 and 2, a schematic configuration of a display device 100 according to an embodiment of the present invention is described. FIG. 1 is a plan view showing a surface on the front side of the display device 100. The display device 100 includes a display unit 110 including a semiconductor layer described later and in which multiple pixels are arranged in a matrix. The display unit 110 displays an image such as a still image or a moving image by causing each pixel to emit light according to an image signal.

In this embodiment, a flexible characteristic allows for a free curving movement. At the same time, screen burn-in due to fixed display of a fixed display image in the display device is prevented to ensure reliability of display by performing, in response to a curving and to suit a bend-degree amount, a control with respect to an image signal for displaying the image in the display unit 110, according to a detected displacement amount in a fixed display portion.

FIG. 2 is a schematic view showing a sectional surface of the display device 100. In this embodiment, as shown in FIG. 2, a first substrate 102, a second substrate 104, and a displacement sensor 106 are stacked to form the extremely thin display device 100 having a thickness of approximately several tens of micrometers. The first substrate 102 is configured with a display element (light-emitting element), which is included in each pixel, formed on a transparent and flexible substrate, e.g., a plastic substrate formed of resin. As the display element, an organic semiconductor or inorganic semiconductor element that can be formed by a low-temperature process may be used. In this embodiment, an organic electroluminescence (EL) element is formed as the display element in the first substrate 102.

The second substrate 104 is also formed of a transparent plastic substrate formed of resin, is arranged to face the first substrate 102 including the display element formed of an organic semiconductor or an inorganic semiconductor, and has a function as a sealing substrate that seals in the display element. In this manner, the display device 100 is formed by two types of substrates, i.e., the first substrate 102 and the second substrate 104, holding the semiconductor layer in between in this embodiment. The display unit 110 displays an image on a surface on the second substrate 104 side. With such a configuration, the display device 100 is formed with a thickness of approximately several tens of micrometers, has flexibility, and can be curved freely in a state where an image is displayed.

As shown in FIGS. 1 and 2, the displacement sensor 106 formed of a transparent electrode body, e.g., an indium tin oxide (ITO) film or an indium zinc oxide (IZO) film, is arranged on a surface of the second substrate 104. The displacement sensor 106 is formed, for example, in a same region as the display unit 110. The displacement sensor 106 is formed of the transparent electrode body, and is each arranged to face the display element of the first substrate 102.

The displacement sensor 106 has a configuration similar to, for example, an electrode for an available touchscreen. Two metal thin films (resistance films) formed of a transparent electrode of ITO, IZO, or the like are arranged to face each other, and multiple pairs of the metal thin films are arranged, for example, in a matrix in a flat surface region. The facing transparent electrodes of the displacement sensor 106 have resistance. One of the electrodes is applied with predetermined voltage, and a resistance value between the electrodes is monitored. With such a configuration, a change in the resistance value can be detected because, when the display device 100 is curved, the resistance value between the two metal thin films changes at a position of a curve and voltage according to the curve is generated at the other electrode. Thus, by detecting the metal thin films for which the resistance value has changed out of the multiple pairs of the metal thin films arranged in the matrix, a position of displacement among the displacement sensors 106 can be detected and a position of bend in the display unit 110 can be detected. The change in the resistance value increases as a bend amount of the display device 100 increases. In this manner, the display device 100 can detect a resistance change amount detected by the displacement sensor 106 and detect a bend position and the bend amount of the display device 100.

Figure 3:
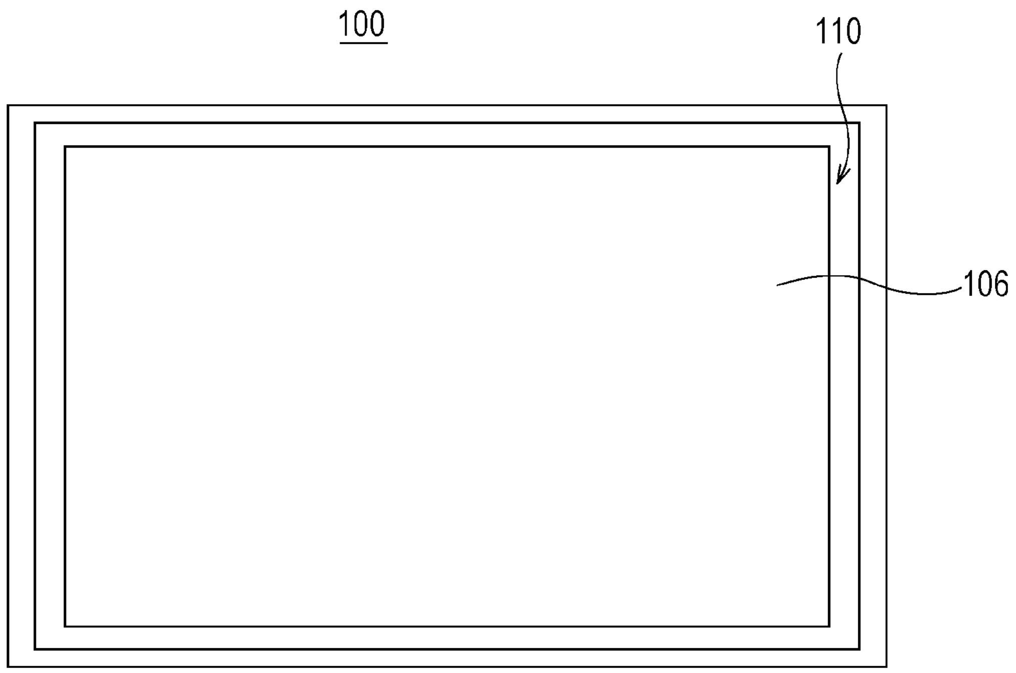
FIG. 3 illustrates an example in which a displacement sensor is provided to the back surface side of a display unit, and is a plan view showing a back surface of the display device.
Figure 4:
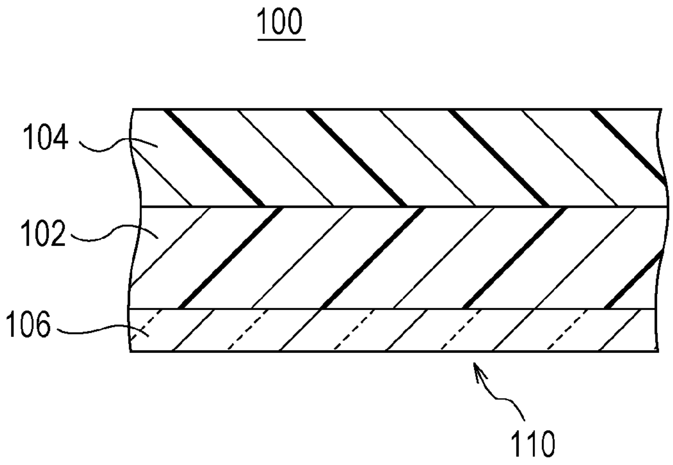
FIG. 4 illustrates the example in which the displacement sensor is provided to the back surface side of the display unit, and is a schematic view showing a sectional surface of the display device.

FIGS. 3 and 4 are schematic views showing an example in which the displacement sensor 106 is provided to the back surface side of the display unit 110. Herein, FIG. 3 shows a plan view of a back surface of the display device 100, and FIG. 4 shows a sectional view of the display device 100. In FIGS. 3 and 4, the configuration of the first substrate 102 and the second substrate 104 is similar to that in the display device 100 in FIGS. 1 and 2. In this configuration example, as shown in FIG. 4, the displacement sensor 106 is provided to a back surface of the first substrate 102. A curve amount and a curve position of the display device 100 can be detected according to a change in the resistance value also when the displacement sensor 106 is provided to the back surface of the display unit 110, in a similar manner to when the displacement sensor 106 is provided to a front surface of the display unit 110.

The schematic configuration of the display device 100 according to the embodiment of the present invention has been described above. The display device 100 shown in FIGS. 1 to 4 has, as described above, a thickness of approximately several tens of micrometers and flexibility. Thus, a user can cause the display device 100 to curve. However, in a state where the display device 100 is curved, there is less possibility of maintaining a display state equivalent to that without a curve. This is because the visibility of the display unit 110 decreases due to the curve of the display device 100.

Figure 5:
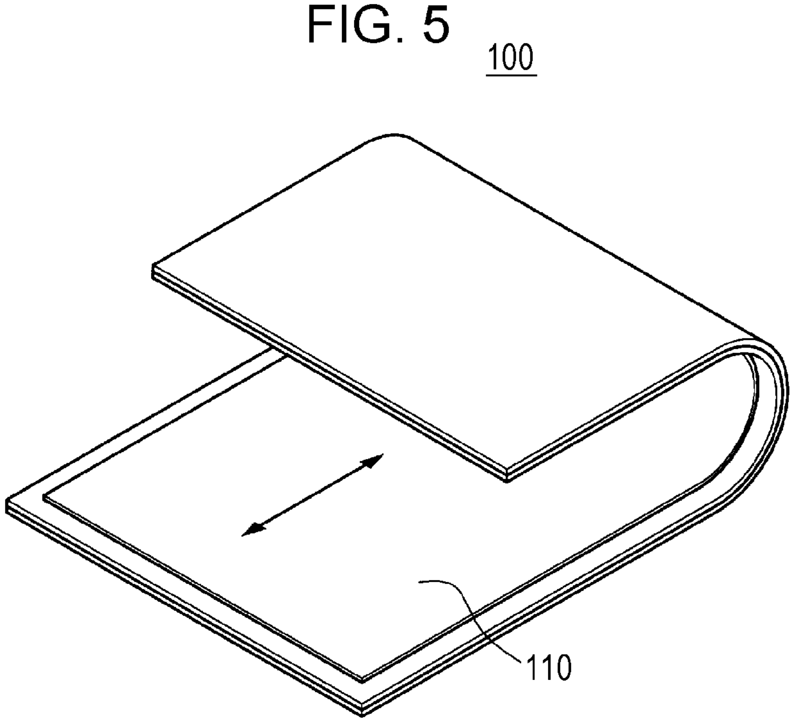
FIG. 5 illustrates a state where the display device is curved, and is a schematic view showing a curved state where the surface on the front side provided with the display unit is a concave surface.
Figure 6:
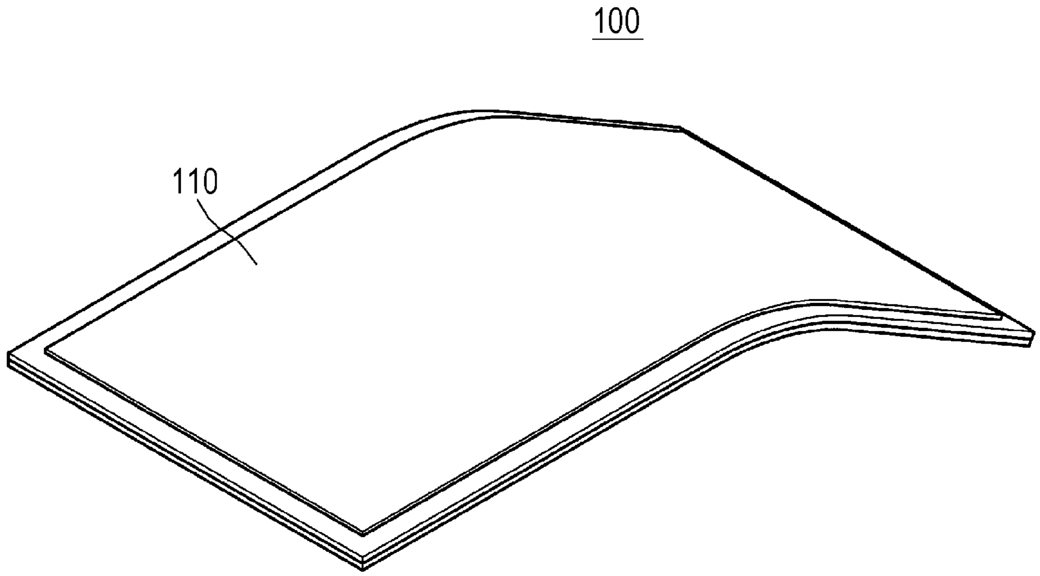
FIG. 6 is a schematic view showing a curved state where the surface provided with the display unit is a convex surface.

FIG. 5 is a schematic view showing the state where the display device 100 is curved, and shows a curved state where the surface on the front side provided with the display unit 110 is a concave surface. FIG. 6 illustrates a curved state where the surface provided with the display unit 110 is a convex surface.

In the state where the display device 100 is curved as shown in FIGS. 5 and 6, it is less important to maintain a normal display state of an image since the visibility of the display unit 110 is reduced by the curve. For example, as in FIG. 5, the image on a display screen is also curved when the curve is such that the display screen is the concave surface. Also, due to the influence of light scattering or the like on the surface, the image quality also decreases compared to when the surface is a flat surface. Therefore, in order to increase the visibility for the user, the display device 100 performs a control such that the image displayed in the display unit 110 is flipped and can be viewed normally even in a state where the display unit 110 is reversed.

Since the image displayed in the display unit 110 is flipped completely particularly when the display screen of the display unit 110 is bent by an angle of approximately 180 degrees as in FIG. 5, the visibility for the user can be ensured by executing the control of vertically flipping the image displayed in the display unit 110. In a similar manner, since the image on the display screen is also curved and the image quality decreases when the curve is such that the display screen of the display unit 110 is the convex surface as in FIG. 6, the visibility for the user can be ensured by executing the control of vertically flipping the image displayed in the display unit 110. In this embodiment, when the display unit 110 is curved, the control with respect to the image displayed in the display unit 110 is performed in this manner in consideration of the less importance of maintaining an image display state before the curving. Specifically, as described above, a flip control with respect to the image displayed in the display unit 110 is executed in order to increase the visibility for the user, and the control is executed so that the image can be viewed normally in a reversed portion of the display unit 110. Accordingly, it is possible to ensure reliability of display at the time of curving of the flexible display device 100 without giving the user a sense of strangeness.

[2. Function Block Configuration of Display Device]

Figure 7:
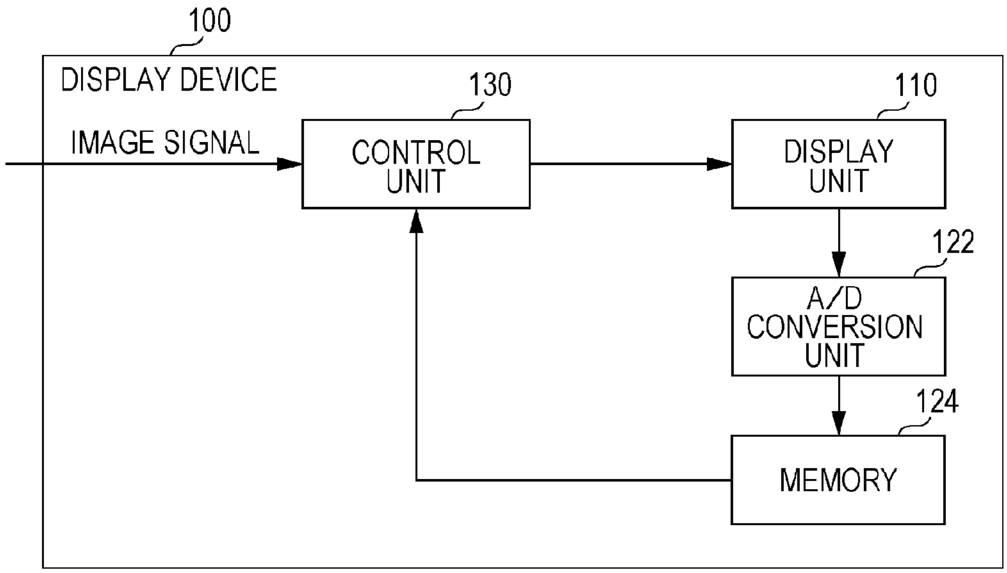
FIG. 7 is a block diagram showing the functional configuration of the display device according to this embodiment.

A specific control technique is described below. FIG. 7 is a block diagram showing the functional configuration of the display device 100 according to this embodiment. The function block configuration of the display device 100 is described below using FIG. 7.

As shown in FIG. 7, the display device 100 according to this embodiment includes the display unit 110, an A/D conversion unit 122, a memory 124, and a control unit 130. As shown in FIGS. 1 to 4, the display unit 110 has a structure in which the first substrate 102, the second substrate 104, and the displacement sensor 106 are stacked. The A/D conversion unit 122 converts a curve amount of the display unit 110 detected as an analog quantity by the displacement sensor 106 to a digital quantity. The memory 124 temporarily stores the curve amount of the display unit 110 which is converted to the digital quantity by the A/D conversion unit 122. The control unit 130 executes various controls with respect to the image displayed in the display unit 110 using the curve amount of the display unit 110 stored in the memory 124.

As described above, the displacement sensor 106 is formed of the transparent ITO film, IZO film, or the like. The ITO film or the IZO film has resistance. When voltage is applied to one resistance film of the two facing resistance films, voltage according to a position of operation by the user with respect to the display unit 110 is generated also at the other one of the facing resistance films. By detecting this voltage, the displacement sensor 106 can detect an operation position as the analog quantity. Thus, the curve amount of the display unit 110 detected as the analog quantity by the displacement sensor 106 can be used by the control unit 130 in determining whether the display unit 110 is curved.

Note that although the curve amount of the display unit 110 converted to the digital quantity by the A/D conversion unit 122 is temporarily stored in the memory 124 in the configuration shown in FIG. 7, embodiments of the present invention are not limited to the example. For example, the configuration may be such that the curve amount of the display unit 110 converted to the digital quantity by the A/D conversion unit 122 is directly supplied to the control unit 130.

[3. Function Block Configuration of Control Unit]

Figure 8:
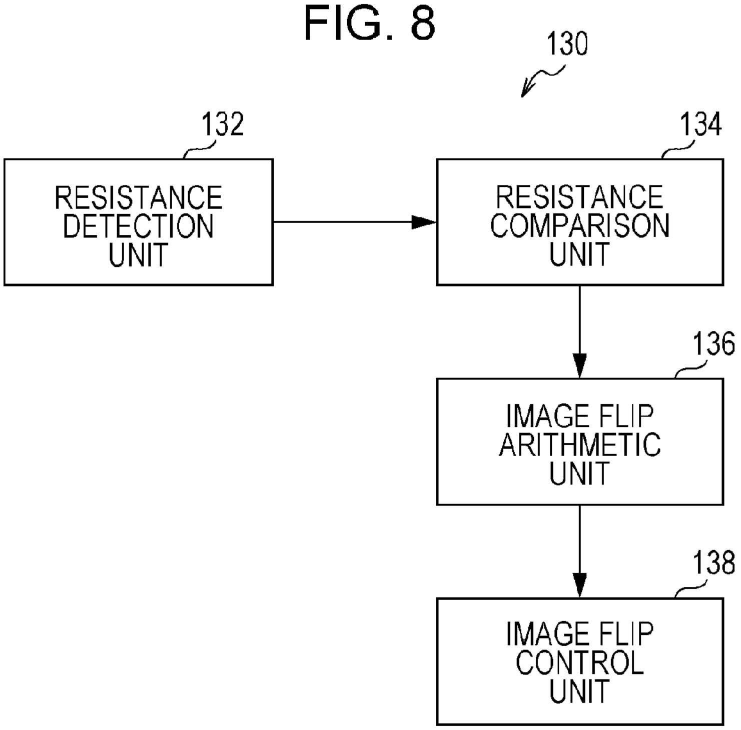
FIG. 8 is a block diagram showing the functional configuration of a control unit according to this embodiment.

The function block configuration of the display device 100 has been described above using FIG. 7. Next, the function block configuration of the control unit 130 shown in FIG. 7 is described. FIG. 8 illustrates the function block configuration of the control unit 130.

A function block of the control unit 130 shown in FIG. 8 includes hardware, such as a sensor or a circuit, or a central processing unit (CPU) with software (program) for enabling a function thereof. As shown in FIG. 8, the control unit 130 includes a resistance detection unit 132, a resistance comparison unit 134, an image flip arithmetic unit 136, and an image flip control unit 138.

The resistance detection unit 132 detects the resistance value output from the displacement sensor 106. The resistance value detected by the resistance detection unit 132 is sent to the resistance comparison unit 134.

The resistance comparison unit 134 compares a reference resistance value in a flat surface state where the display device 100 is not curved and the resistance value detected by the resistance detection unit 132. By comparing the resistance values and calculating the change amount of the resistance value with the resistance comparison unit 134, the degree of the curve of the display device 100 can be detected. Information of the change amount of the resistance value calculated by the resistance comparison unit 134 is sent to the image flip arithmetic unit 136.

The image flip arithmetic unit 136 uses the change amount of the resistance value calculated by the resistance comparison unit 134 to determine and output an image flip control amount to be used in an image flip control process by the image flip control unit 138 at a later stage. When the resistance comparison unit 134 detects a certain detection voltage, the image flip arithmetic unit 136 determines that the display unit 110 is not in a proper state capable of a normal image display and performs an arithmetic operation to determine whether the image should be flipped and displayed. The image flip control unit 138 uses the image flip control amount determined by the image flip arithmetic unit 136 to execute the image flip control process of flipping the image displayed in the display unit 110. The image flip arithmetic unit 136 may determine the image flip control amount in a region corresponding to a curved portion in which a resistance change is detected among the multiple displacement sensors 106 arranged in the matrix. Then, the image flip control unit 138 may execute the image flip control process in the region corresponding to the curved portion based on position information, which is input from the resistance comparison unit 134, of the displacement sensor 106 where the resistance change has occurred.

Figure 9:
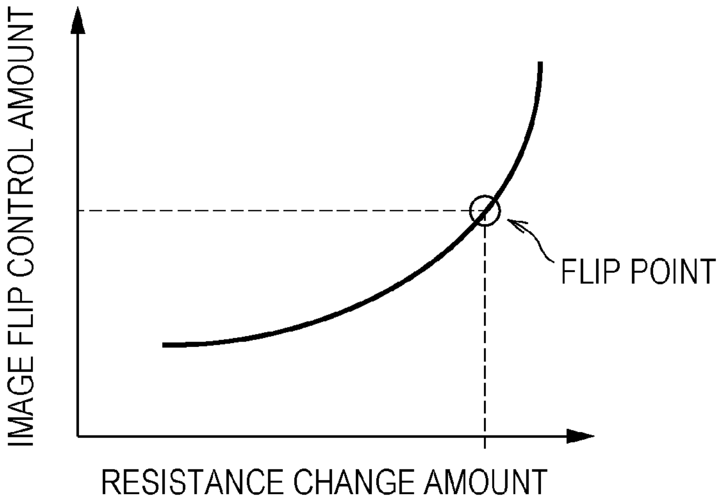
FIG. 9 is a schematic view showing an example of an LUT specifying an image flip control amount according to a resistance change amount.

In the image flip arithmetic unit 136, the image flip control amount to be controlled according to the resistance change amount is stored in advance in the form of a lookup table (LUT). FIG. 9 illustrates an example of the relation between the resistance change amount and the image flip control amount stored in the form of the lookup table. In this embodiment, the image flip control process is performed using data stored in advance as shown in FIG. 9. When the resistance change amount is small, the image flip control amount is set to be small, i.e., the image flip control for the display unit 110 is not executed, as shown in FIG. 9. The image flip control amount increases as the resistance change amount increases, and the control of flipping the image displayed in the display unit 110 is executed when a predetermined resistance change amount is exceeded. Accordingly, when the bend of the display unit 110 is great, the image displayed in the display unit 110 can be flipped by increasing the image flip control amount to ensure the visibility of the display unit 110 and maintain the display performance at a high level. On the other hand, when the curve amount of the display unit 110 is small, a meaningless execution of an image flipping process can be prevented by not executing the image flip control.

Also, each parameter of the LUT, specifying the relation between the voltage detected as a result of comparison by the resistance comparison unit 134 and the image flip control amount, may be changeable to an arbitrary value.

Figure 10:
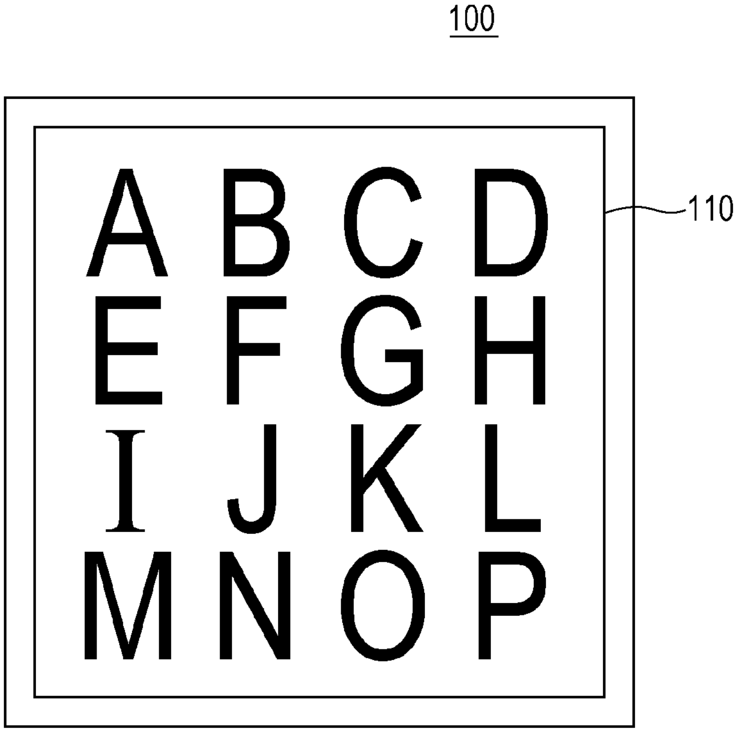
FIG. 10 illustrates an example of an image displayed in the display unit of the display device.
Figure 11:
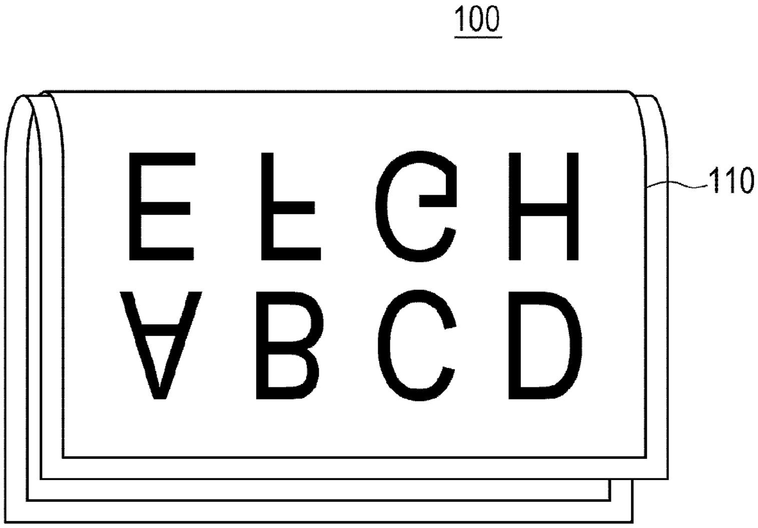
FIG. 11 is a schematic view of a case where the image displayed in the display unit of the display device is flipped due to a curve of the display device.

FIG. 10 shows an example of the image displayed in the display unit 110 of the display device 100 as a display example in a state where the display device 100 is not at all curved. When the display device 100 is held at an upper portion and curved 180 degrees by the user in the state where the image is displayed as shown in FIG. 10, the image displayed in an upper half of the display unit 110 is in a flipped state. The image displayed in the upper half of the display unit 110 in the flipped state is shown in FIG. 11.

Figure 12:
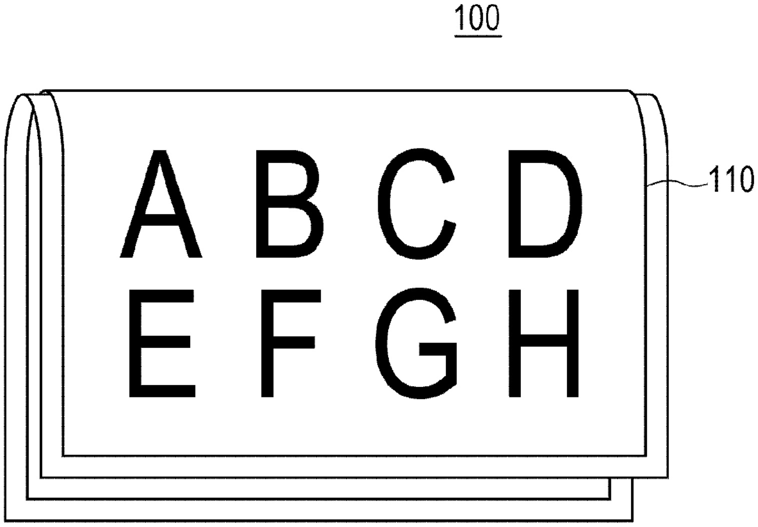
FIG. 12 is a schematic view showing an application of a flip control to the image displayed in the display unit of the display device.

FIG. 12 is a schematic view showing an application of the flip control by the image flip control unit 138 to the image displayed in the display unit 110 according to the curve amount of the display device 100. The image flip control unit 138 executes the control of vertically flipping the image so that the image in the upper portion can be recognized normally even when the display device 100 is greatly curved, as shown in FIG. 12. By executing a vertical flipping process of the image with the image flip control unit 138, the image can be recognized normally even when the transparent display device 100 is greatly curved.

Figure 13:
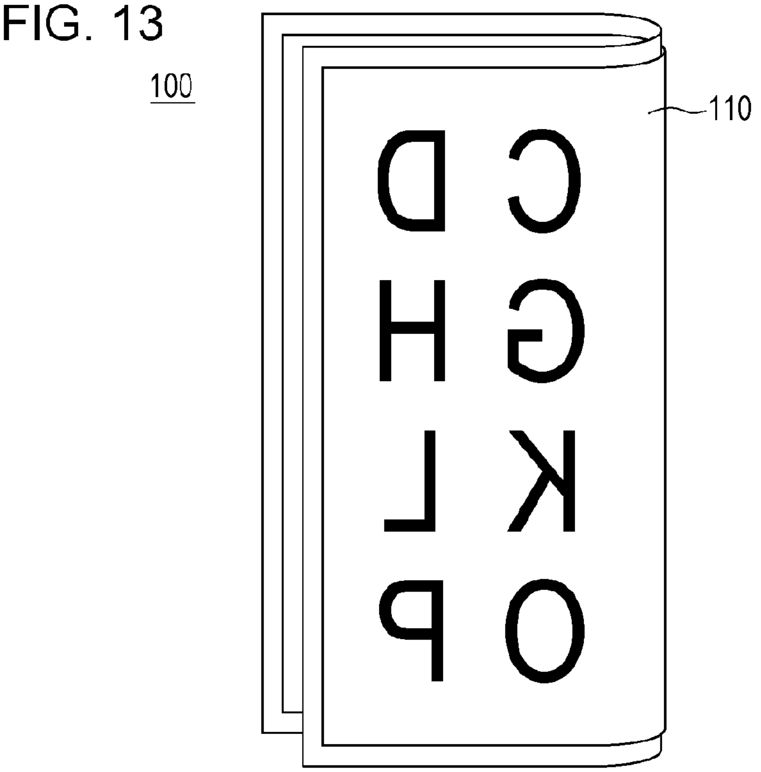
FIG. 13 is a schematic view of a case where the image displayed in the display unit of the display device is flipped due to a curve of the display device.

In a similar manner, when the display device 100 is held at a right portion and curved 180 degrees by the user in the state where the image is displayed as shown in FIG. 10, the image displayed in a right half of the display unit 110 is in a flipped state. The image displayed in the right half of the display unit 110 in the flipped state is shown in FIG. 13.

Figure 14:
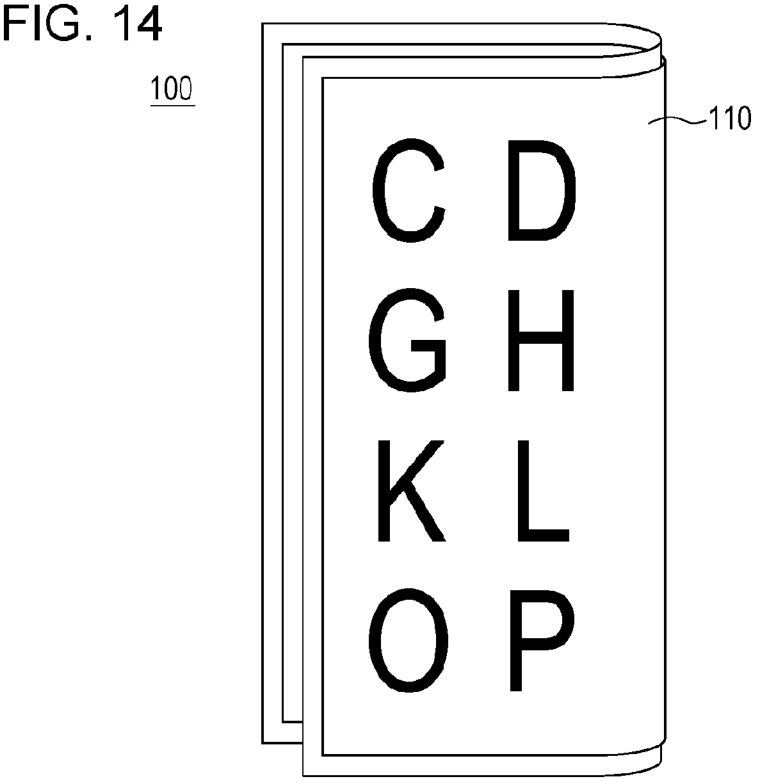
FIG. 14 is a schematic view showing an application of the flip control to the image displayed in the display unit of the display device.

FIG. 14 is a schematic view showing an application of the flip control by the image flip control unit 138 to the image displayed in the display unit 110 according to the curve amount of the display device 100. The image flip control unit 138 executes the control of horizontally flipping the image so that the image in the right portion can be recognized normally even when the display device 100 is greatly curved, as shown in FIG. 14. By executing a horizontal flipping process of the image with the image flip control unit 138, the image can be recognized normally even when the transparent display device 100 is greatly curved.

By executing the image flip control according to the curve amount of the display device 100 with the control unit 130 in this manner, it is possible to normally recognize the image even in the state where the display device 100 is curved. Note that the image flip control by the control unit 130 is obviously not limited the example described above. It is obviously possible for the control unit 130 to execute the flip control with respect to the image displayed in the display unit 110 according not only to the curve amount of the display device 100 but also to the curve position of the display device 100.

Note that a case where the first substrate 102 and the second substrate 104 are transparent has been described in this embodiment. However, embodiments of the present invention are not limited to the example. For example, it is obvious that the embodiment of the present invention can be applied in a similar manner even when the second substrate 104 is not transparent and the display unit 110 is not recognized from the back surface of the display device 100. That is, when the display device 100 is held at the upper portion and curved toward the near side from the back surface side by the user, the image displayed in the display unit 110 may be vertically flipped and displayed for the user. The image can be recognized normally by executing the flip control described above in this case as well.

[4. Configuration Example in which Displacement Sensor is Provided to Front and Back Surfaces]

Figure 15:
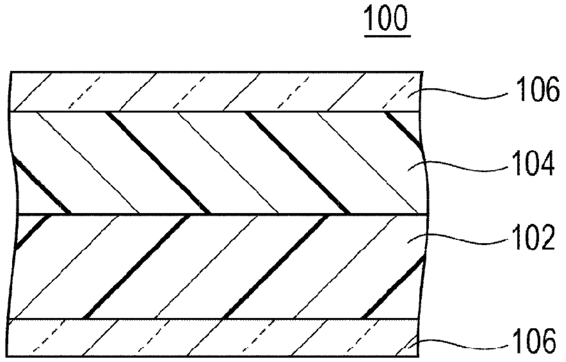
FIG. 15 illustrates a sectional surface of the display device, and is a schematic view showing a configuration example in which the displacement sensor is provided to front and back surfaces of the display device.
Figure 16:
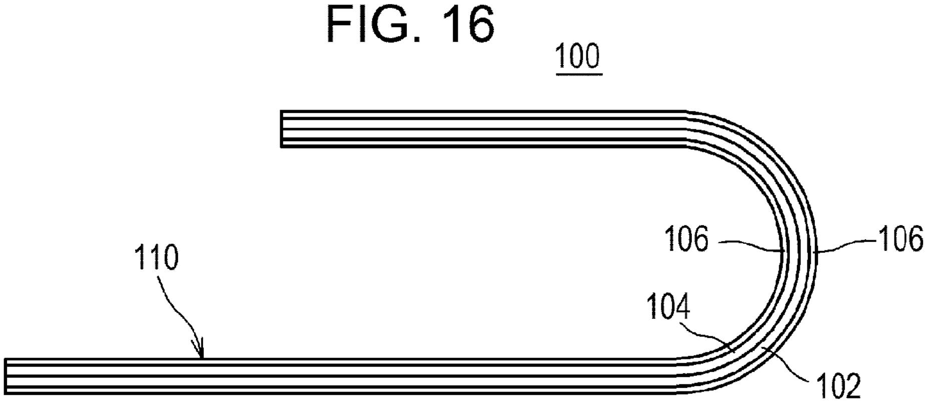
FIG. 16 is a schematic view showing a state where the display device shown in FIG. 15 is curved.

FIG. 15 is a schematic view showing a sectional surface of the display device 100, and shows a configuration example in which the displacement sensor is provided to front and back surfaces of the display device 100. FIG. 16 is a schematic view showing a state where the display device 100 shown in FIG. 15 is curved. In the curved portion in the case of FIG. 16, a radius of curvature of the displacement sensor 106 on the back surface side where the display unit 110 is not provided is greater than a radius of curvature of the displacement sensor 106 on the front surface side where the display unit 110 is provided. More specifically, the radius of curvature of the displacement sensor 106 on the back surface side is greater by the thickness of the first substrate 102 and the second substrate 104. Therefore, a curve amount of the displacement sensor 106 on the front surface side is greater compared to a curve amount of the displacement sensor 106 on the back surface side, and the resistance change amount of the displacement sensor 106 on the front surface side where the curve amount is greater is greater than the resistance change amount of the displacement sensor 106 on the back surface side.

Thus, when the resistance change amounts are detected by the displacement sensors 106 on the front and back surfaces in the configuration shown in FIG. 15, comparing the resistance change amounts of the front and back surfaces allows one of the front and back surfaces to be detected as a concave surface and the other as a convex surface. When the front surface is the concave surface, it is possible to increase the image flip control amount in order to increase the visibility of the image displayed in the display unit 110, since the display unit 110 is more hidden from the outside compared to when the front surface is the convex surface and the display unit 110 is less recognizable. On the other hand, when the front surface is the convex surface, it is possible to differentiate the image flip control between a case where the front surface is the convex surface and a case where the front surface is the concave surface by reducing the image flip control amount compared to when the front surface is the concave surface even if the curve amount is the same, since the visibility of the image increases compared to when the front surface is the concave surface despite the image being curved.

[5. Another Example of Lookup Table]

Figure 17:
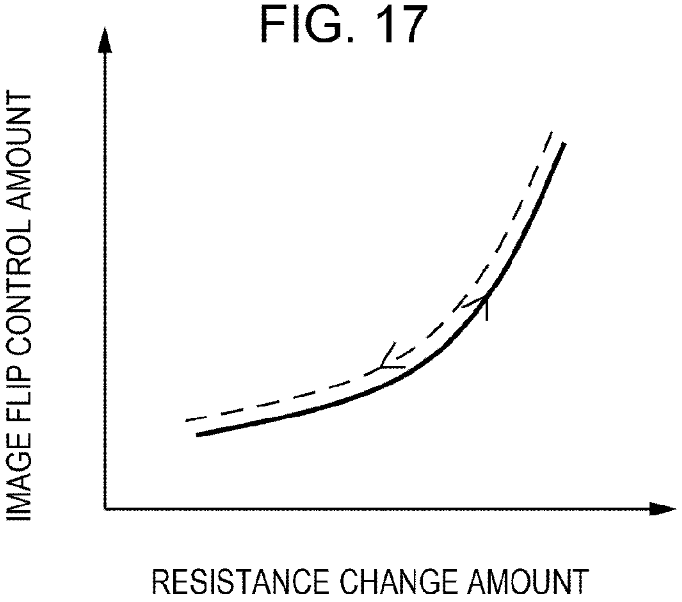
FIG. 17 is a schematic view showing another example of the lookup table.

FIG. 17 is a schematic view showing another example of the lookup table. In the example shown in FIG. 17, the image flip control amounts with respect to the resistance change amount are different in a process in which the display device 100 is bent and a process in which a bend is recovered.

In the lookup table shown in FIG. 17, a characteristic curve (shown by a solid line in FIG. 17) in the process in which the display device 100 is bent is similar to that in FIG. 9. On the other hand, a characteristic curve shown by a broken line in FIG. 17 is applied in the process in which the bend is recovered, so that a change amount of the image flip control amount with respect to the resistance change amount is greater in a region in which the resistance change amount is great and the change amount of the image flip control amount with respect to the resistance change amount is smaller in a region in which the resistance change amount is small. Accordingly, when a bent state recovers to a flat surface, an image applied with the image flip control can recover to an original state at a relatively early stage. Thus, the image flip control can be prevented reliably from giving the user a sense of strangeness when the curved display device 100 recovers to the flat surface.

The present application contains subject matter related to that disclosed in Japanese Priority Patent Application JP 2009-277851 filed in the Japan Patent Office on Dec. 7, 2009, the entire contents of which are hereby incorporated by reference.

The preferred embodiment of the present invention has been described above in detail with reference to the accompanying drawings. However, the present invention is not limited to the examples. It is clear to those skilled in the art to which the present invention pertains that various modifications or alterations are conceivable within the scope of the technical idea described in the embodiment of the present invention, and it should be understood that they are also naturally within the technical scope of the present invention.

What is claimed is:

1. A display device comprising:

a flexible substrate;

a display unit including multiple light-emitting elements arranged on the substrate and configured to display an image according to an image signal;

a displacement sensor provided on at least one of a front surface and a back surface of the substrate and configured to detect an amount of curvature of the substrate; and a control unit configured to perform a flip control with respect to the image displayed on the display unit such that a flipped representation of the image is displayed on the display unit on a first side of a curvature based on the amount of curvature of the substrate and position information identifying a position of the curvature of the substrate, the first side being separated from a second side by the curvature, wherein, the control unit is configured to provide the flip control with respect to (i) a horizontal axis to display the flipped representation of the image according to a first orientation and (ii) a vertical axis to display the flipped representation of the image according to a second orientation that is different from the first orientation, the vertical axis being perpendicular to the horizontal axis with respect to a display unit orientation, the control unit selectively performs flip control with respect to one of the horizontal and the vertical axes of the display unit based on the amount of curvature and the position information, the control unit performs the flip control when the amount of curvature is greater than a predetermined value, and the control unit does not perform the flip control when the amount of curvature is not greater than the predetermined value.

2. The display device according to claim 1, further comprising:

an image flip arithmetic unit configured to determine an advisability of the flip control based on a lookup table specifying a relation between an output of the displacement sensor and the advisability of the flip control of the image;

wherein the control unit performs the flip control with respect to the image displayed in the display unit based on the advisability of the flip control determined by the image flip arithmetic unit.

3. The display device according to claim 1, wherein the substrate is transparent.

4. The display device according to claim 1, wherein the displacement sensor includes a pair of transparent electrodes formed of ITO or IZO and is configured to detect the curved state of the substrate based on a change in resistance value between the pair of transparent electrodes.

5. The display device of claim 1, wherein:

the control unit performs the flip control such that a flipped representation of the image is displayed only on the first side of the curvature.

6. A method of controlling a display device, comprising:

detecting a curved state of a flexible substrate provided with a display unit configured to display an image according to an image signal, the curved state being based on an amount of curvature of the substrate;

determining whether or not the amount of curvature is greater than a predetermined value, and when the amount of curvature is determined to be greater than a predetermined value, performing a flip control with respect to the image displayed on the display unit such that a flipped representation of the image is displayed on the display unit on a first side of a curvature based on the amount of curvature of the substrate and position information identifying a position of the curvature of the substrate, the first side being separated from a second side by the curvature, wherein, the control unit is configured to provide the flip control with respect to (i) a horizontal axis to display the flipped representation of the image according to a first orientation and (ii) a vertical axis to display the flipped representation of the image according to a second orientation that is different from the first orientation, the vertical axis being perpendicular to the horizontal axis with respect to a display unit orientation, the control unit selectively performs flip control with respect to one of the horizontal and the vertical axes of the display unit based on the amount of curvature and the position information, and the flip control is not performed when the amount of curvature is not greater than the predetermined value.

* * * * *